United States Patent
Shastry et al.

(10) Patent No.: US 12,014,750 B2
(45) Date of Patent: *Jun. 18, 2024

(54) AUDIO ANALYSIS OF BODY WORN CAMERA

(71) Applicant: TRULEO, INC., Chicago, IL (US)

(72) Inventors: Tejas Shastry, Chicago, IL (US); Svyatoslav Vergun, Morton Grove, IL (US); Colin Brochtrup, Chicago, IL (US); Matthew Goldey, Zionsville, IN (US)

(73) Assignee: TRULEO, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,652

(22) Filed: Mar. 8, 2023

(65) Prior Publication Data

US 2023/0223038 A1 Jul. 13, 2023

Related U.S. Application Data

(63) Continuation of application No. 17/553,482, filed on Dec. 16, 2021.

(60) Provisional application No. 63/264,151, filed on Nov. 16, 2021, provisional application No. 63/143,538, (Continued)

(51) Int. Cl.
| | |
|---|---|
| *G10L 25/57* | (2013.01) |
| *G10L 15/18* | (2013.01) |
| *G10L 15/26* | (2006.01) |
| *G10L 17/00* | (2013.01) |
| *G10L 25/87* | (2013.01) |

(52) U.S. Cl.
CPC .......... *G10L 25/57* (2013.01); *G10L 15/1815* (2013.01); *G10L 15/26* (2013.01); *G10L 17/00* (2013.01); *G10L 25/87* (2013.01)

(58) Field of Classification Search
None
See application file for complete search history.

(56) References Cited

U.S. PATENT DOCUMENTS

| | | |
|---|---|---|
| 3,296,374 A | 1/1967 | Clapper |
| 7,409,349 B2 | 8/2008 | Wang et al. |
| 7,447,654 B2 | 11/2008 | Ben-Levy et al. |

(Continued)

OTHER PUBLICATIONS

PCT Notification of Transmittal of the International Search Report and the Written Opinion of the International Searching Authority, or the Declaration, PCT/ISA/220, PCT/US2021/063873, Dated Jun. 29, 2023, 9 Pages.

(Continued)

*Primary Examiner* — Neeraj Sharma
(74) *Attorney, Agent, or Firm* — PIERSON FERDINAND LLP; Keats Quinalty (57) ABSTRACT

Machine natural language processing to analyze language in apparatus, systems, and methods of using are provided. Audio from camera footage can be transcribed in one exemplary method includes extracting at least one audio segment from a body camera video track, detecting voice activity to identify starting and ending timestamps of voice, transcribing the at least one audio segment to identify and separate audio of at least a first speaker, and scoring the audio of the first speaker to identify interactions of interest. Audio could be analyzed and scored to record verbal performance, respectfulness, wellness, etc. and speakers from the audio can be detected.

19 Claims, 10 Drawing Sheets

Related U.S. Application Data filed on Jan. 29, 2021, provisional application No. 63/126,368, filed on Dec. 16, 2020.

(56) References Cited

U.S. PATENT DOCUMENTS

| | | |
|---|---|---|
| 7,475,046 B1 | 1/2009 | Foley et al. |
| 7,533,054 B2 | 5/2009 | Hausman et al. |
| 7,536,335 B1 | 5/2009 | Weston et al. |
| 7,610,547 B2 | 10/2009 | Wang et al. |
| 7,643,998 B2 | 1/2010 | Yuen et al. |
| 7,685,048 B1 | 3/2010 | Hausman et al. |
| 7,689,495 B1 | 3/2010 | Kim et al. |
| 7,774,247 B2 | 8/2010 | Hausman et al. |
| 7,822,672 B2 | 10/2010 | Hausman |
| 8,019,665 B2 | 9/2011 | Hausman |
| 8,099,352 B2 | 1/2012 | Berger et al. |
| 8,321,465 B2 | 11/2012 | Farber et al. |
| 8,332,384 B2 | 12/2012 | Kemp |
| 8,438,158 B2 | 5/2013 | Kemp |
| 8,442,823 B2 | 5/2013 | Jeon et al. |
| 8,473,396 B2 | 6/2013 | Hausman et al. |
| 8,489,587 B2 | 7/2013 | Kemp |
| 8,504,483 B2 | 8/2013 | Foley et al. |
| 8,676,679 B2 | 3/2014 | Hausman et al. |
| 8,788,397 B2 | 7/2014 | Berger et al. |
| 8,799,140 B1 | 8/2014 | Toffee et al. |
| 8,878,853 B2 | 11/2014 | Baransky et al. |
| 8,909,516 B2 | 12/2014 | Medero et al. |
| 8,965,765 B2 | 2/2015 | Zweig et al. |
| 9,313,173 B2 | 4/2016 | Davis et al. |
| 9,330,659 B2 | 5/2016 | Ju et al. |
| 9,613,026 B2 | 4/2017 | Hodson |
| 9,728,184 B2 | 8/2017 | Xue et al. |
| 9,760,566 B2 | 9/2017 | Heck et al. |
| 9,824,698 B2 | 11/2017 | Jerauld |
| 9,870,424 B2 | 1/2018 | Neystadt et al. |
| 9,906,474 B2 | 2/2018 | Robarts et al. |
| 10,002,520 B2 | 6/2018 | Bohlander et al. |
| 10,108,306 B2 | 10/2018 | Khoo et al. |
| 10,185,989 B2 | 1/2019 | Ritter et al. |
| 10,192,277 B2 | 1/2019 | Hanchett et al. |
| 10,210,869 B1 | 2/2019 | King et al. |
| 10,237,716 B2 | 3/2019 | Bohlander et al. |
| 10,237,822 B2 | 3/2019 | Hanchett et al. |
| 10,298,875 B2 | 5/2019 | Klein et al. |
| 10,354,169 B1 | 7/2019 | Law et al. |
| 10,354,350 B2 | 7/2019 | Nakfour et al. |
| 10,368,225 B2 | 7/2019 | Hassan et al. |
| 10,372,755 B2 | 8/2019 | Blanco |
| 10,381,024 B2 | 8/2019 | Tan et al. |
| 10,417,340 B2 | 9/2019 | Applegate et al. |
| 10,419,312 B2 | 9/2019 | Alazraki et al. |
| 10,460,746 B2 | 10/2019 | Costa et al. |
| 10,477,375 B2 | 11/2019 | Bohlander et al. |
| 10,509,988 B2 | 12/2019 | Woulfe et al. |
| 10,534,497 B2 | 1/2020 | Khoo et al. |
| 10,586,556 B2 | 3/2020 | Caskay et al. |
| 10,594,795 B2 | 3/2020 | Hanchett et al. |
| 10,630,560 B2 | 4/2020 | Adylov et al. |
| 10,657,962 B2 | 5/2020 | Zhang et al. |
| 10,685,075 B2 | 6/2020 | Blanco et al. |
| 10,713,497 B2 | 7/2020 | Womack et al. |
| 10,720,169 B2 | 7/2020 | Reitz et al. |
| 10,755,729 B2 | 7/2020 | Reitz et al. |
| 10,779,022 B2 | 9/2020 | MacDonald |
| 10,779,152 B2 | 9/2020 | MacDonald |
| 10,785,610 B2 | 9/2020 | Bohlander et al. |
| 10,796,393 B2 | 10/2020 | Messerges et al. |
| 10,805,576 B2 | 10/2020 | Hanchett et al. |
| 10,825,479 B2 | 11/2020 | Hershfield |
| 10,848,717 B2 | 11/2020 | Hanchett et al. |
| 10,853,435 B2 | 12/2020 | Reitz et al. |
| 10,872,636 B2 | 12/2020 | Smith et al. |
| 11,423,911 B1* | 8/2022 | Fu .............. G10L 15/26 |
| 11,947,872 B1* | 4/2024 | Mahler-Haug ......... G10L 15/02 |
| 11,948,555 B2* | 4/2024 | Christie ......... H04N 21/234345 |
| 2007/0167689 A1 | 7/2007 | Ramadas et al. |
| 2009/0292638 A1 | 11/2009 | Hausman |
| 2010/0121880 A1 | 5/2010 | Ursitti et al. |
| 2010/0332648 A1 | 12/2010 | Bohus et al. |
| 2011/0270732 A1 | 11/2011 | Ritter et al. |
| 2012/0004914 A1 | 1/2012 | Strom et al. |
| 2013/0156175 A1 | 6/2013 | Bekiares et al. |
| 2013/0173247 A1 | 7/2013 | Hodson |
| 2013/0300939 A1* | 11/2013 | Chou .............. G06V 10/85 |
| | | 348/700 |
| 2014/0006248 A1 | 1/2014 | Toffee |
| 2014/0081823 A1 | 3/2014 | Phadnis et al. |
| 2014/0101739 A1 | 4/2014 | Li et al. |
| 2014/0187190 A1 | 7/2014 | Schuler et al. |
| 2014/0207651 A1 | 7/2014 | Toffey et al. |
| 2015/0310729 A1 | 10/2015 | Lampert et al. |
| 2015/0310730 A1 | 10/2015 | Miller et al. |
| 2015/0310862 A1 | 10/2015 | Dauphin et al. |
| 2015/0381933 A1* | 12/2015 | Cunico .............. G11B 27/036 |
| | | 348/14.08 |
| 2016/0066085 A1* | 3/2016 | Chang .............. H04R 3/00 |
| | | 381/122 |
| 2017/0132703 A1 | 5/2017 | Oomman et al. |
| 2017/0316775 A1 | 11/2017 | Le et al. |
| 2017/0346904 A1 | 11/2017 | Fortna et al. |
| 2017/0364602 A1 | 12/2017 | Reitz et al. |
| 2018/0107943 A1 | 4/2018 | White et al. |
| 2018/0233139 A1 | 8/2018 | Finkelstein et al. |
| 2018/0350389 A1 | 12/2018 | Garrido et al. |
| 2019/0019297 A1* | 1/2019 | Lim .............. G06V 10/95 |
| 2019/0042988 A1 | 2/2019 | Brown et al. |
| 2019/0096428 A1 | 3/2019 | Childress et al. |
| 2019/0108270 A1 | 4/2019 | Dunne et al. |
| 2019/0121907 A1 | 4/2019 | Brunn et al. |
| 2019/0188814 A1 | 6/2019 | Kreitzer et al. |
| 2019/0258700 A1 | 8/2019 | Beaver et al. |
| 2019/0318725 A1 | 10/2019 | Le Roux et al. |
| 2020/0104698 A1 | 4/2020 | Cintra |
| 2020/0195726 A1 | 6/2020 | Hanchett et al. |
| 2020/0210907 A1 | 7/2020 | Ulizio et al. |
| 2020/0302043 A1 | 9/2020 | Vachon |
| 2020/0342857 A1* | 10/2020 | Moreno .............. G10L 15/20 |
| 2020/0365136 A1* | 11/2020 | Candelore .............. G10L 25/30 |
| 2021/0092224 A1* | 3/2021 | Rule .............. H04L 63/1491 |
| 2021/0374601 A1* | 12/2021 | Liu .............. G06N 20/00 |
| 2022/0115022 A1* | 4/2022 | Sharifi .............. G06F 21/32 |
| 2022/0122615 A1* | 4/2022 | Chen .............. G10L 21/028 |
| 2022/0310109 A1* | 9/2022 | Donsbach .............. G10L 17/24 |
| 2023/0103060 A1* | 3/2023 | Chaudhuri .............. G06V 20/41 |
| | | 382/118 |

OTHER PUBLICATIONS

PCT Written Opinion of the International Searching Authority, PCT/ISA/210, Dated Mar. 10, 2022, 14 Pages.

\* cited by examiner

FIG. 1

| Feature | Value |
| --- | --- |
| Transcript | Calm Down Sir uh Calm Down |
| Intent | De-Escalation |
| Sentiment Label | Positive |
| Sentiment Polarity | 0.25 |
| Sentiment Subjectivity | 0.11 |
| Word Disfluency | 7.0 |

| Conversation | Respect Score |
|---|---|
| Informal Title ↑    Question ↑<br>Hey, [Buddy] [Why] are you not wearing your car seat belt? [Can you tell me the reason.]<br>↓<br>Ask For Agency | -0.4 |
| Give Agency ↑    Negative ↑    Negative ↑<br>Either [Pay fine] or we will [take your car] under [custody.] | -0.2 |
| Formal Title ↑    Adverbial ↑<br>Alright [Miss.] [I just] want to get your name and phone number. If you think of anything else, [please] [notify us.]<br>↓    ↓<br>Please Ask For Agency | 0.3 |
| Apology ↑    Ask For Agency ↑<br>[Sorry] to bother you, um, [are you okay] to answer some questions for me? → Question | 0.1 |
|                                             Name ↑<br>You were also going over the speed limit, [Mr. Davidson.] I'm going to have to ask you to [step out] of your vehicle and get into my car.<br>↓<br>Negative | 0.1 |

| Most Popular De-Escalation Phrases | De-Escalation Time |
|---|---|
| 1. I see your point and totally understand your situation | 68Sec |
| 2. What would help you right now? | 69Sec |
| 3. So, you're upset because...right? | 69Sec |
| 4. I'm here for you | 70Sec |
| 5. I'm Listening, please continue! | 70Sec |
| 6. Let's talk about this later | 72Sec |
| 7. I want to help you | 73Sec |
| 8. Please tell us more, we are here to help! | 75Sec |
| 9. You're not in trouble | 79Sec |
| 10. Please clam down | 80Sec |

FIG. 5B

Top 10 Negative Events

| Event #086 | Event #029 | Event #032 | Event #124 | Event #532 |
| --- | --- | --- | --- | --- |
| 17 Oct, 2020 13:10 | 13 Oct, 2020 11:12 | 12 Sep, 2020 23:09 | 14 Dec, 2020 13:10 | 24 Jun, 2020 13:10 |
| Officer 1 | Officer 2 | Officer 3 | Officer 4 | Officer 5 |
| Hotwords 29 | Hotwords 22 | Hotwords 19 | Hotwords 17 | Hotwords 22 |
| Neg. Phrases 29 | Neg. Phrases 09 | Neg. Phrases 19 | Neg. Phrases 11 | Neg. Phrases 10 |
| Avg Sentiment -88 | Avg Sentiment -78 | Avg Sentiment -75 | Avg Sentiment -75 | Avg Sentiment -35 |

| Event #086 | Event #029 | Event #032 | Event #124 | Event #532 |
| --- | --- | --- | --- | --- |
| 28 Oct, 2020 13:10 | 01 Dec, 2020 11:12 | 11 Sep, 2020 23:09 | 26 Aug, 2020 13:10 | 02 Jan, 2021 13:10 |
| Officer 6 | Officer 7 | Officer 8 | Officer 9 | Officer 10 |
| Hotwords 25 | Hotwords 20 | Hotwords 15 | Hotwords 17 | Hotwords 12 |
| Neg. Phrases 27 | Neg. Phrases 06 | Neg. Phrases 16 | Neg. Phrases 04 | Neg. Phrases 10 |
| Avg Sentiment 03 | Avg Sentiment -30 | Avg Sentiment -22 | Avg Sentiment 15 | Avg Sentiment 25 |

FIG. 6

| Feature | Example |
|---|---|
| Directed Profanity | F*** you, Man |
| Use of Force | Shots Fired |
| Escalation | Okay, F****g Idiot |
| Disobedience | I Won't get Out |
| Command | Get Down on the Ground |
| Negative Informality | Jane, How'd you Get Here? Hey Dude, Where are you Going? |
| Weapon | Hey Look He Has a Weapon |
| Profanity | This is S*** |
| Question | Where are You Going? |
| Feeling | I'm Just Really Tired |
| Explanation | I'm Stopping You Because Your tall Light Was Out |
| Empathy | You Doing Alright? Maybe You Can Tell Me What Happened I'm Sorry |
| De-Escalation | Hey, Can we Talk Away from the Road so we Don't have to Shout? |
| Gratitude | Thanks for Understanding |
| Formality | Mr. Smith, I Need to See Your Identification Hi, I'm Officer Jones and I'm Checking on a Call I Received |
| Positive Informality | Don't Worry about it, Man You're Totally Fine |

FIG. 7

| Feature | Type | Weighting |
|---|---|---|
| Directed Profanity | Entity | 0.96 |
| Informality: First Name | Entity | 0.88 |
| Command | Entity | 0.8 |
| Informality: Informal Title | Entity | 0.65 |
| Informality: Disfluency | Entity | 0.36 |
| Profanity | Entity | 0.24 |
| Use of Force | Intent | 1.0 |
| Disobedience | Intent | 1.0 |
| Escalation | Intent | 1.0 |

FIG. 8

| Feature | Type | Weighting |
|---|---|---|
| Formality: Introduction | Entity | -0.18 |
| Empathy: Safety | Entity | -0.54 |
| Formality: Greeting | Entity | -0.74 |
| Formality: Last Name | Entity | -0.75 |
| Empathy: Hedge | Entity | -0.18 |
| Empathy: Adverbial Just | Entity | -0.24 |
| Empathy: Give Agency | Entity | -0.34 |
| Empathy: Filled Pause | Entity | -0.37 |
| Formality: Title | Entity | -0.73 |
| Formality: Salutation | Entity | -1.03 |
| Empathy: Reassurance | Entity | -1.04 |
| Gratitude | Entity | -1.04 |
| Empathy: Apology | Entity | -1.34 |
| Question | Intent | -0.2 |
| Feeling | Intent | -0.3 |
| Explanation | Intent | -0.5 |
| De-Escalation | Intent | -1.0 |

FIG. 9

AUDIO ANALYSIS OF BODY WORN CAMERA

CROSS-REFERENCE TO RELATED APPLICATIONS

The present application is a continuation of U.S. patent application Ser. No. 17/553,482, filed Dec. 16, 2021, which claims the benefit of U.S. Provisional Patent Application No. 63/126,368, filed Dec. 16, 2020, U.S. Provisional Patent Application No. 63/143,538, filed Jan. 29, 2021, and U.S. Provisional Patent Application No. 63/264,151, filed Nov. 16, 2021, the entire contents of each of which are incorporated herein by reference as if repeated herein.

SUMMARY

In one aspect, apparatus, systems, and/or methods of analysis of audio from body worn cameras, including through natural language processing is detailed. The audio can be analyzed in real-time, such as, for example, during a police encounter, or alternatively, at least a portion of the audio can be analyzed at a later time.

In exemplary scenarios involving police officers, while nearly 50% of police officers wear body cameras, and while hundreds of hours of footage is recorded each day, only a fraction of the footage is ever analyzed and/or reviewed. As many police departments look for better oversight and training of their police force, few departments are able to leverage body camera data as a source of insight into their interactions with the community.

The apparatus, systems, methods, and processes described herein offer departments an efficient and effective way of analyzing body camera data. The analysis can be utilized in many aspects, including efforts to improve training tactics, provide better oversight, etc.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain exemplary features of the disclosure. In the drawings:

FIG. 6 shows exemplary summaries across various officers.

DETAILED DESCRIPTION

In the drawings, like numerals indicate like elements throughout. Certain terminology is used herein for convenience only and is not to be taken as limiting. The terminology includes the words specifically mentioned, derivatives thereof, and words of similar import. The embodiments illustrated below are not intended to be exhaustive or to limit to the precise form disclosed. These embodiments are chosen and described to best explain the principles, application, and practical use, and to enable others skilled in the art to best utilize the present disclosure.

The present disclosure details analysis of audio, such as from video tracks and/or real-time interactions from audio or video recordings. The analyses detailed herein is primarily focused on the audio analysis of interactions. Several examples provided herein involve body cameras, also termed body worn cameras, and police officers. These scenarios are presented as exemplary only and not intended to limit the disclosure in any manner. This disclosure could be applied without limitation to audio from other sources, with such audio able to be analyzed from any other scenario and processed similarly. For example, such alternative scenarios could not involve police officers, could be from cameras that are not body worn, or could involve altercations. In other examples, the body cam can be worn by an emergency technician, a firefighter, a security guard, a citizen instead of a police officer, police during interview of a suspect, interactions in a jail or prison, such as, for example, between guards and inmates or between inmates, or other person. Additionally, the body cam can be worn by an animal or be positioned on or in an object, such as a vehicle. It is understood, therefore, that this disclosure is not limited to the particular embodiments disclosed, but it is intended to cover modifications within the spirit and scope of the present disclosure as defined by the appended claims. The same behavior and emotional sentiments captured can also be applied to scenarios including, but not limited to, conversations within sales teams, conversations involving financial transactions, conversations between counterparties where one party may be privy to valuable information that they cannot share with the other, or conversations between counterparties where one holds a degree of power (legal, authoritative, managerial, etc.) over another.

In at least one example detailed herein involving police officers, research shows that language used in police interactions as measured by humans reviewing body worn camera (BWC) video shows disparities in officer behavior based on the use of respectful or disrespectful language (see, e.g., https://www.pnas.org/content/114/25/6521). Simply put: using more respectful language leads to fewer escalated scenarios. However, the vast amount of footage to be reviewed to make determinations of the use of respectful language across a department is nearly impossible to process with solely human review.

In at least one aspect, the present disclosure details transcription of BWC audio and separation of the audio into individualized, anonymous speakers. In at least one example, the speaker wearing the camera is tagged anonymously as the officer. The systems and methods described involve natural language processing (NLP) models operable to run on the speaker-separated transcript, identifying key phrases associated with risky or respectful interactions. Features are weighted based on a department's preference for detection (e.g., directed profanity is worse than informality). In addition, the present systems and methods tag events, like arrests and use of force, as a further dimension to analyze risk. In at least one embodiment, the officer identification allows selectively transcribing and/or analyzing only either the officer or only transcribing and/or analyzing the civilian (or other non-officer) audio. While there may be several reasons for allowing selective transcription or analyzing, in at least one instance, this option could be important for legal mandates, including, to not analyze, or specifically redact, civilian or officer audio in relevant cases. In other aspects and exemplary scenarios, redaction of officer, civilian, or other audio may apply to sections or entire segments of transcripts or selections.

In at least one aspect, the detailed systems and methods utilize NLP models that use a modern architecture termed a "transformer". These models learn based on context, not keywords. Thus, seeing a word used in context, the models can automatically extrapolate synonyms or other potential variations of the word. In this way, the models of the present detailed systems and methods are able to capture key phrases associated with risk and respect with only a handful of examples.

Officer Detection

Given a set of anonymous speakers, it is nearly impossible to figure out who the officer is on conventional methods like voice fingerprinting. Instead, in at least one aspect, the present detailed systems and methods use an assumption common to body-worn camera usage: that the person wearing the camera is the officer.

The present detailed systems and methods measure the voice quality of each speaker using a set of metrics that include:
  Short Time Intelligibility Measure (stoi)
  time domain segmental signal to noise ratio (SNRseg)
  frequency weighted segmental signal to noise ratio (fwSNRseg)
  Normalized Covariance Metric (ncm)

The highest signal quality is labeled as a potential officer. In some cases, multiple speakers may still have high quality signal, if for example the officer is facing away from the microphone and a civilian is talking directly. In these cases, the present detailed systems and methods use an additional text-based classifier that is trained on officer-specific language patterns.

Scalable, Compliant Ingestion of Body Camera Audio

Figure 1:
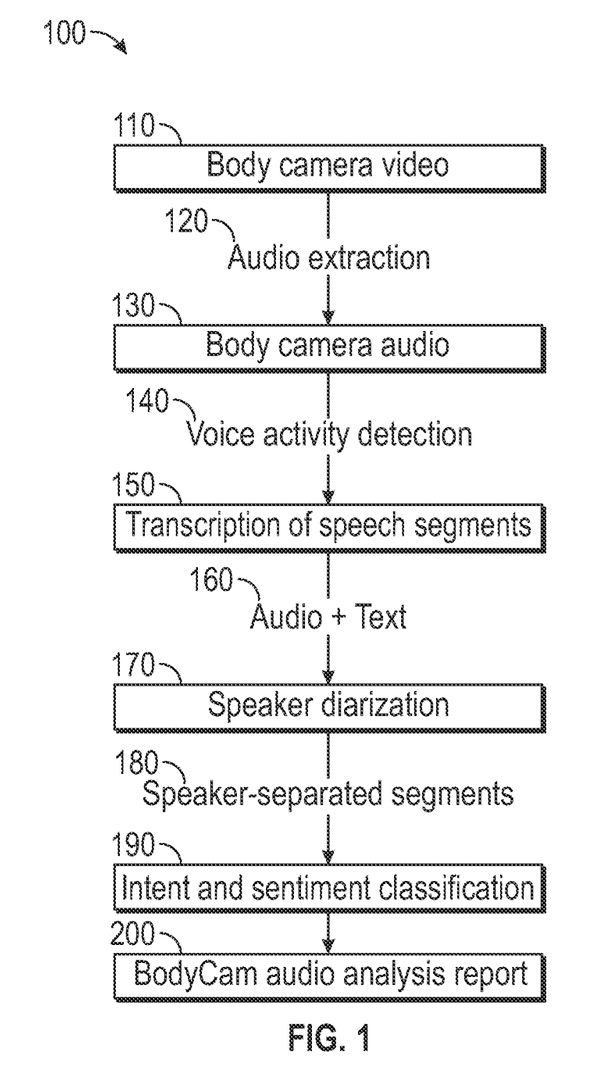
FIG. 1 shows an exemplary end-to-end flow of body camera or cam audio analysis.

FIG. 1 shows an exemplary method for reducing the footprint of data for efficient analysis. As many police departments produce hundreds to thousands of hours per day of body camera recordings across their police force, it is challenging, if not prohibitive, to process such a large amount of data in a cost effective form.

FIG. 1 shows an exemplary analysis flowchart 100 of body camera video footage 110. The footage is first processed such that the audio track is isolated from the video at 120. Discarding video information initially by retaining only the audio can greatly reduce the cost of and increasing the speed of transferring data and analyzing data with machine learned models. For example, audio may only be a fraction (e.g., for example, 5%) of the information in a selection of footage, which could, in some instances, markedly increase the speed of transfer and analysis while markedly reducing the cost. Next, the audio 130 is streamed through a voice activity detection model at 140, which identifies the starting and ending timestamps within the audio track where voice is detected at 150. These sections of audio 150 are streamed into an automatic speech recognition model that outputs the text transcription of the selection of audio at 160. At 170, speaker diarization is performed to create speaker segmented segments at 180. At 190, intent and sentiment classification is performed and a body cam audio analysis report is issued at 200.

In at least one embodiment, during the entire pipeline process, audio is only retained in temporary memory and not written to disk, enabling a privacy-compliant method for transcribing sensitive audio. The separated audio data can be streamed in real-time for analysis or from an already stored file. Subsequent analysis of the file, including based on the features of interest documented below, can be used as a determination of whether a recording should be maintained long-term, including if it contains data of interest. In at least one embodiment, the original audio from the video file is added in "long term storage", and can be analyzed at a subsequent time. In one example, the analysis documented could be used as a way to determine videos of interest. Here, for example, a video termed "of interest" could be retained for long term storage, while a video not termed "of interest" could be deleted, classified, or recommended for deletion, including for further analysis before deletion. Additionally, in at least one embodiment, metadata relating to the officer wearing the camera, the date and time, and location data can be maintained along with the corresponding audio during processing.

Speaker Diarization of Audio

In at least one exemplary embodiment, as the audio stream is transcribed into text, each word is assigned a start and stop time. Segments of the audio transcript are generated by the speech recognition model based on natural pauses in conversation.

In at least one embodiment, the audio and text is then further streamed to a speaker diarization model that analyzes the audio stream for speaker changes, as shown at 170 in FIG. 1. If a speaker change occurs and is measured by the model, the text is periodically re-segmented such that segments contain only a single speaker, e.g. at 180 in FIG. 1. In at least one embodiment, this process is performed after transcription, rather than during or before, such that noises and other disruptions that are common in body cam audio do not adversely affect a continuous single speaker transcription. If diarization is performed before transcription, these breaks can break the continuity of the transcription in a way that can lower transcription accuracy.

Intent and Entity Classification and Sentiment Analysis of Transcribed Audio

In at least one embodiment, after transcription and diarization, the speaker-separated text transcription is analyzed through an intent classification model. The intent classification model utilizes a deep-learned transformer architecture and, in at least one example, is trained from tagged examples of intent types specific for police interactions. Specifically, in at least one exemplary embodiment, intent labels classify words or phrases as: 'aggression', 'anxiety', 'apology', 'arrest', 'bias', 'bragging', 'collusion', 'de-escalation', 'fear', 'general', 'gratitude', 'manipulation', 'mistrust', 'reassurance', 'secrecy', etc. The classifier can also tag "events" by words and phrases, in at least one example, effectively tagging as the consequence of a speaker's intent. In at least one exemplary scenario, such a classifier can identify "get your hands off of me" as a "use of force" event, or "you have the right to remain silent" as an "arrest" event.

In one aspect, the intent classification leverages types of features to determine the correct intent with one or more models or model layers. First, the entire text of the segment is chunked into words up to a maximum defined sequence length. Second, each segment of text is run through one or more transformer-based models. Each transformer model either outputs a single intent label (as mentioned above) or a set of entity labels (such as person, address, etc.). For models where a single intent label is captured, that single intent label is used as is. For models where entity labels are captured, those captured labels are subject to further analysis by a layer of the model that determines the final intent label. Many transformer architectures lend themselves to stacking similar model layers. Thus, the intent and entity models can be combined for some or all of the labels listed above, such that a single model performs both tasks and outputs a single intent label.

In at least one embodiment, alongside the intent classifier, a sentiment analysis model tags each segment in three ways:

First, in at least one exemplary embodiment, the labels of 'very positive', 'positive', 'neutral', 'negative', and 'very negative' are output by the sentiment classifier trained in a similar way to the intent classifier, each with a probability. The aggregate probability of "positive" labels is subtracted from the aggregate probability of "negative" labels to produce a sentiment polarity. The probability of the top label subtracted from 1 is used as a "subjectivity" score. The subjectivity score gives an estimate of how likely it is that two human observers would differ in opinion on the interpretation of the polarity. Thus, sentiment labels can be filtered for ones with "low subjectivity", which may provide more "objective" negative or "objective" positive sentiments and be used to objectively quantify the sentiment of an event. Where highly objective negative statements can identify interactions of interest where either an officer or a person of interest is escalating a situation, likewise, highly objective positive statements can identify successful de-escalation of a situation (see, for example, the conversation in FIGS. 4A and 4B).

Second, in at least one exemplary embodiment, the transcribed text output is analyzed for word disfluencies. Disfluencies are instances of filler words (uh, uhms, so) and stutters. These disfluencies can be an indicator of speaker confidence, and the log-normalized ratio of disfluencies in each segment compared to the number of words is output as a second sentiment metric.

Third, entities detected by the intent classifier previously mentioned can be given manual weights that correlate with positive or negative sentiment, such as an entity capturing "profanity" weighted as "very negative" with a score of −1.0.

Figure 2:
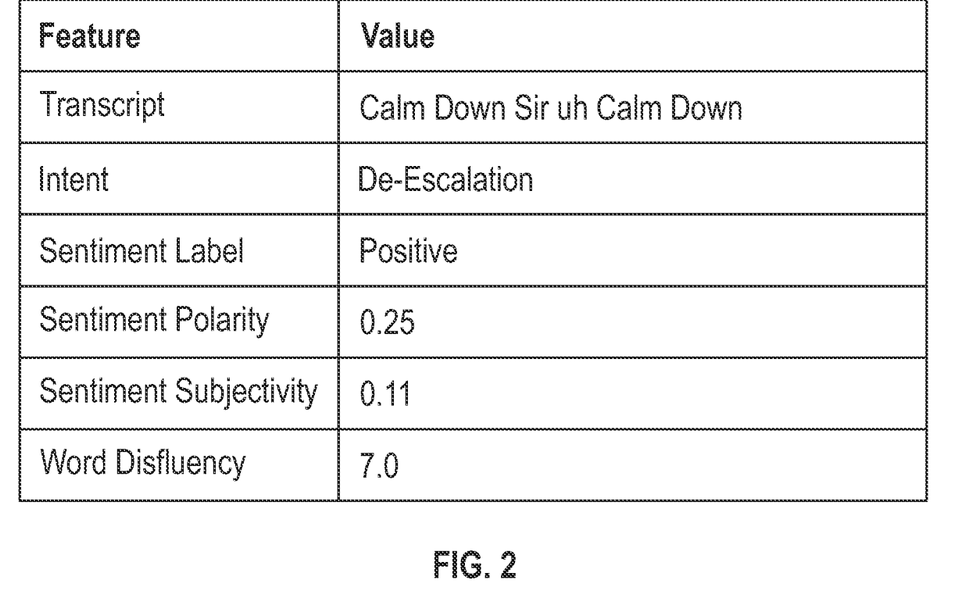
FIG. 2 shows Table 1 with example features extracted via intent and sentiment analysis of a body cam transcription segment.

An example output of these metrics for a particular phrase is shown at 300 in Table 1 in FIG. 2. The phrase "calm down sir uh calm down" is transcribed and labeled for intent (de-escalation), sentiment label (positive), sentiment polarity (0.25), sentiment subjectivity (0.11), and word disfluency (7.0).

Identification of De-escalation Events and Analysis of Bias

Figure 3:
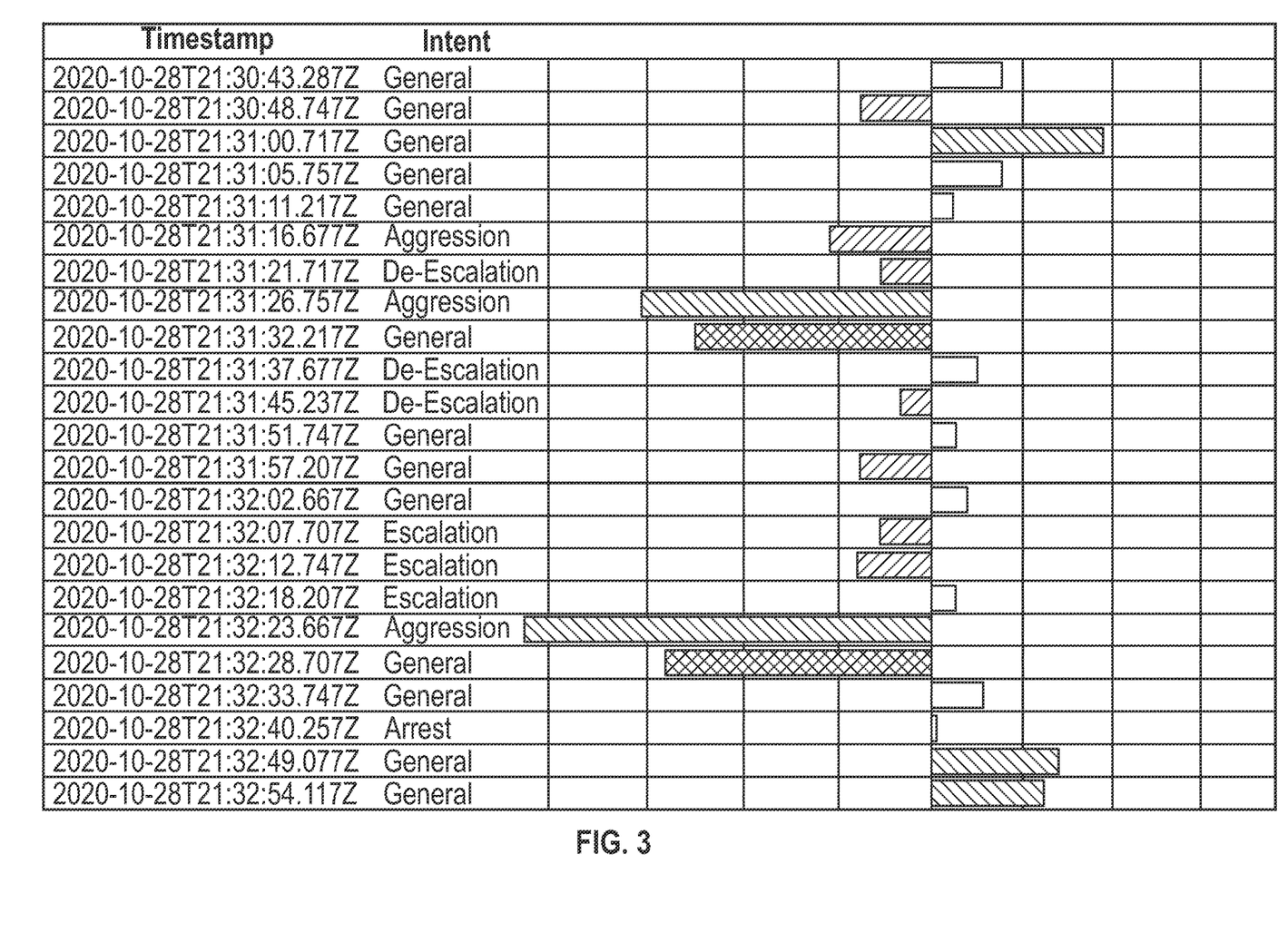
FIG. 3 shows an example analysis showing intent labels and sentiment polarity of an event extracted from body camera audio.

In at least one exemplary embodiment, the combination of sentiment and intent labels across speaker-separated segments of the body cam audio transcript enables the identification of de-escalation events and their efficacy. FIG. 3 shows an example of an event analyzed by one exemplary method described in at least one aspect herein. FIG. 3 shows an exemplary method that involves a communication between police and community participants, where both instances of positive and negative sentiment can be seen (note extensions from centralized vertical line). Following negative sentiment, in this exemplary embodiment shown in FIG. 3, de-escalation phrases are used to attempt to resolve sentiment to a neutral or positive position. In the exemplary event shown in FIG. 3, several de-escalation events are necessary before sentiment stabilizes, but the event eventually escalates to an arrest (note third from bottom entry).

In FIG. 3, the time from the initial negative sentiment event to the arrest can be determined as the "de-escalation time", and, for example, the transcript of the segments of de-escalation can be further analyzed and compared to other events to determine which phrases lead to the fastest and most successful de-escalations.

For events such as the one shown as represented in FIG. 3, a police report is typically generated documenting features such as the gender and race of the suspects or participants involved. The report and analysis can provide joint value in two ways. Features within the transcript that are identified, such as persons, addresses, weapons, etc., for example, can be used to populate the report automatically. Second, the report data can be compared against event analyses such as the one shown in FIG. 3, to identify whether sentiment polarity or word disfluency differs between interactions of participants of different races, which, among other things, can be indications of racial bias.

Further, since the features extracted effectively classify body cam videos as ones with "content of interest" (including, e.g., strongly negative or positive sentiment, a large number of sentences with strong emotions, such as aggression, misconduct, etc.), the analysis performed by the engine can be used as a method to identify videos that should be retained long term and/or enable departments to delete videos that are not of interest, e.g., due to lack of interesting content. This deletion could save storage costs for police departments.

Figure 4A:
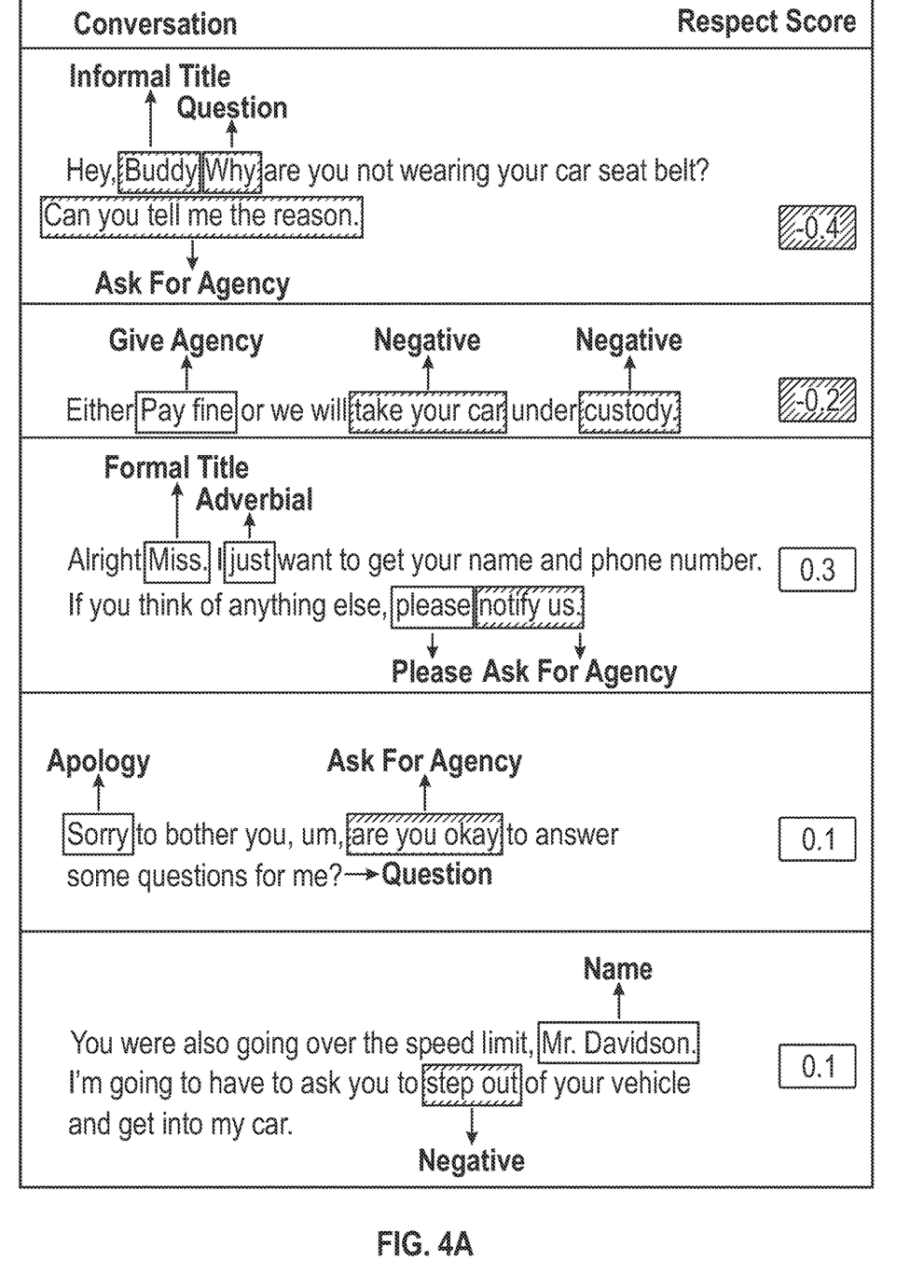
FIGS. 4A and 4B show an exemplary analysis of transcribed audio and sentiment summaries.

Exemplary usage of the analysis is shown in FIGS. 4A-6 in the form of summarized reports generated from the analysis on audio from FIG. 3. FIG. 4*a* shows an analysis of the transcribed audio where particular phrases and entities are tagged as positive sentiment, negative sentiment, or various behaviors and emotions. The average sentiment polarity as described above can be interpreted as a "respect score", and a summary of the number of times respectful vs disrespectful interactions can be generated as shown in FIG. 4*b*. These aggregate metrics enable tracking, for example: (1) the overall respectfulness of officers over time by comparing the number of respectful vs disrespectful interactions, e.g., month over month, and (2) the ways in which officers are being respectful or disrespectful in an effort to expose areas of improvement for police training, etc.

Figure 4B:
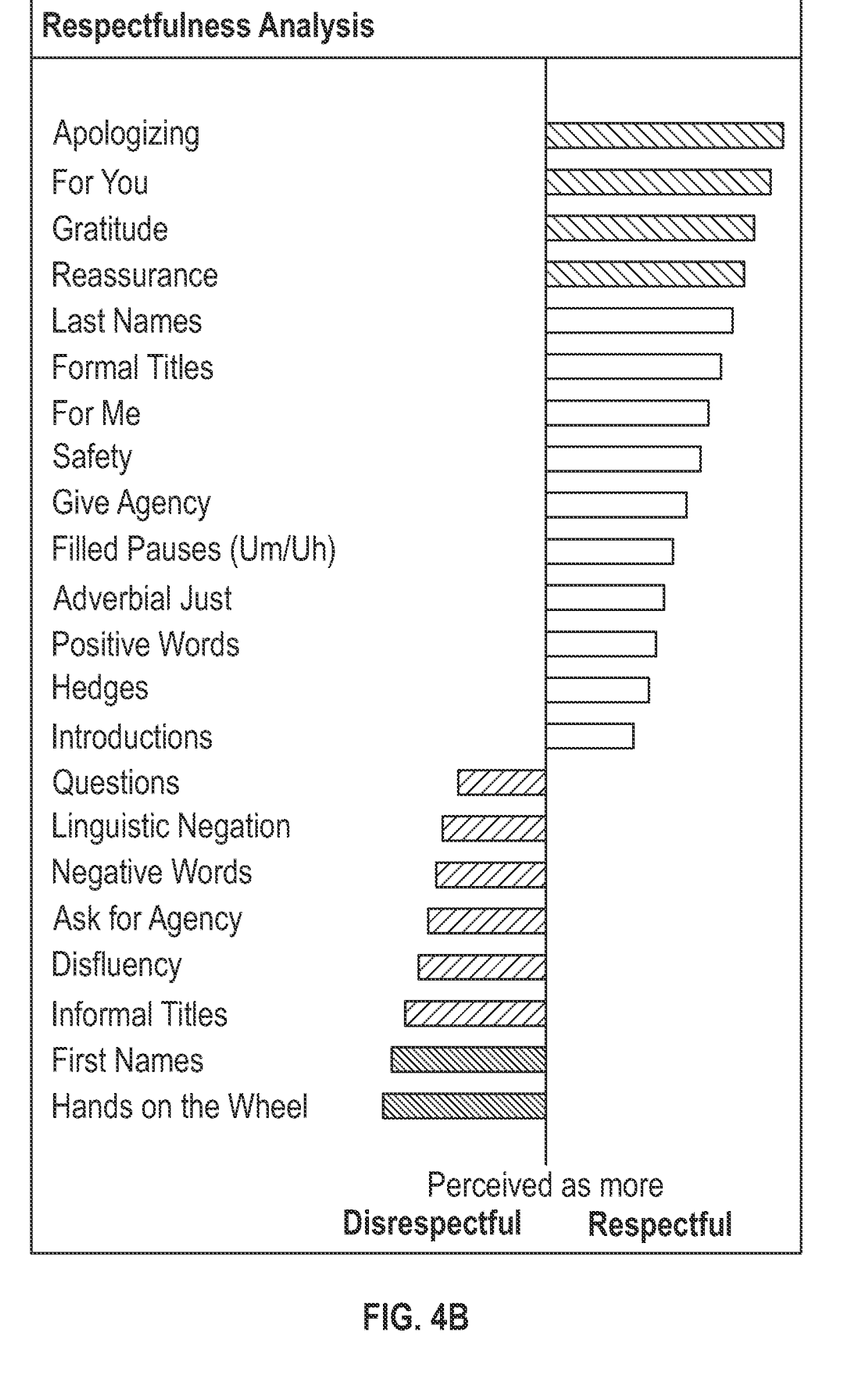
Figure 5A:
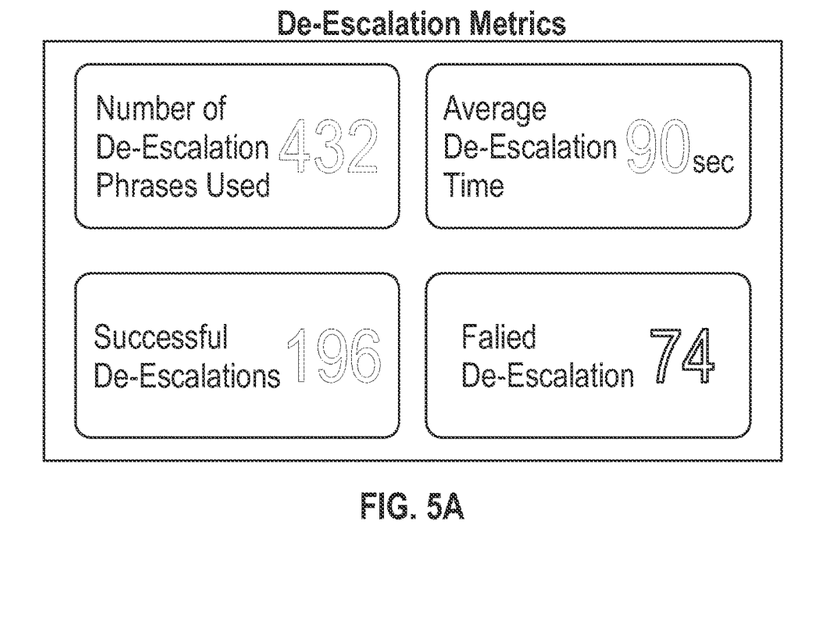
FIGS. 5A and 5B show an aggregate summary of metrics and combinations with top metrics.
Figure 5B:
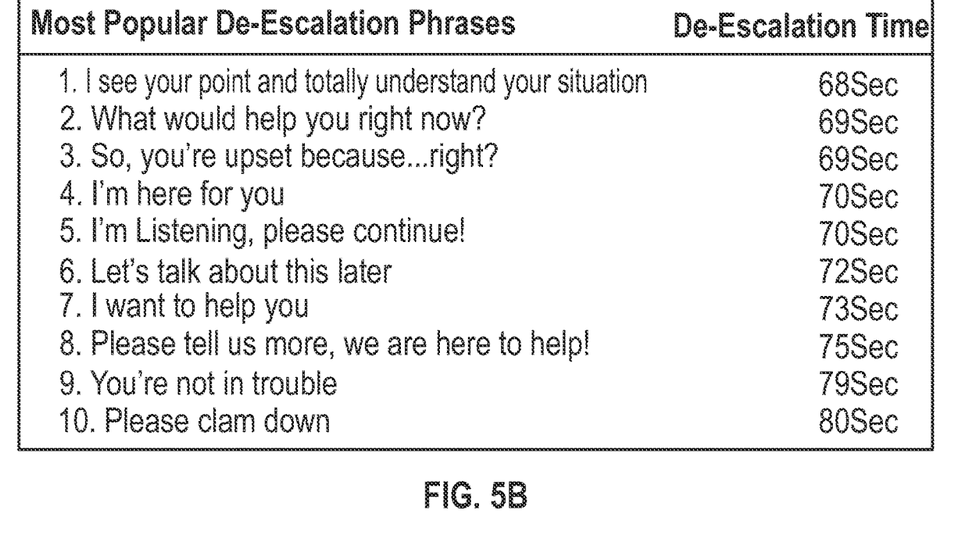

FIGS. 5A and 5B show interpretations of the FIG. 3 analysis from FIGS. 4A and 4B. As previously mentioned, points of negative sentiment can be identified as beginning of event escalations, and contrastly, points of positive sentiment can be identified as end of escalations. The classified behaviors and emotions between those points can be identified as de-escalation tactics, and the efficacy of these tactics can be measured by comparing the time required for sentiment to resolve from negative to positive. FIG. 5A shows an aggregate summary of these metrics and, combined with a list of top metrics in FIG. 5B, a department can utilize these metrics to identify police tactics, behaviors, and phrases that are most successful at de-escalation of events.

The timeline of events in FIG. 3 can also be summarized as shown in FIG. 6 across various officers. By summarizing the number of negative sentiments, undesirable behaviors and emotions (such as aggression), and other features, the analysis conducted by the methods described herein can act as an early warning system for officers that may either be (1) conveying negative sentiment often and may be unnecessarily escalating situations, or (2) receiving negative sentiment from their interactions and may be at risk for burn-out.

Analyzing Risky/Respectful Language With Intent and Entity Detection

Figure 7:
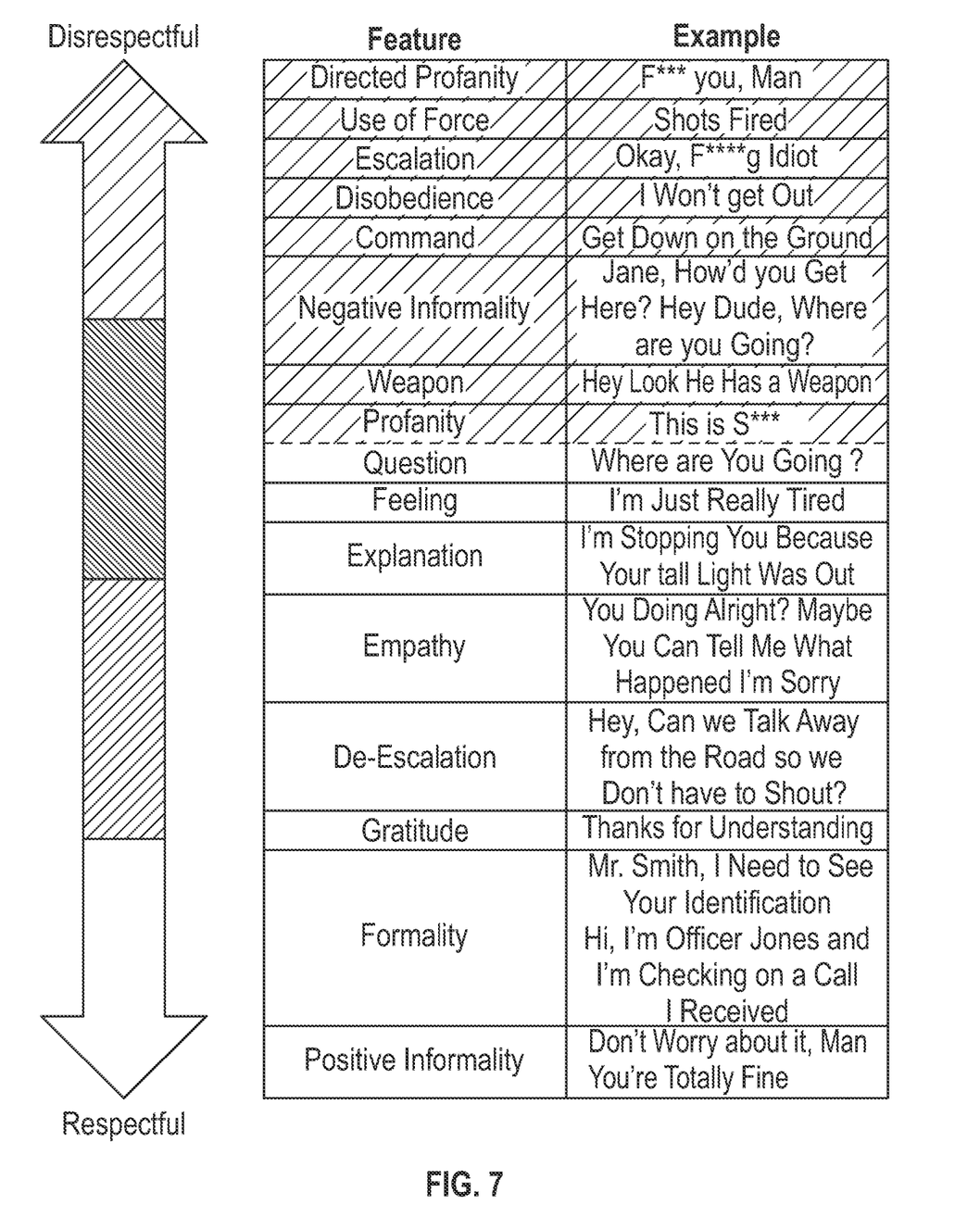
FIG. 7 shows exemplary training of an intent and entity model.

In at least one exemplary embodiment, an intent classifier identifies the event occurring (accident, arrest, etc.) and a sentiment model simply labels the language as positive or negative. As shown in FIG. 7, the system and methods detailed herewithin train an intent and entity model that identifies many linguistic features.

Figure 8:
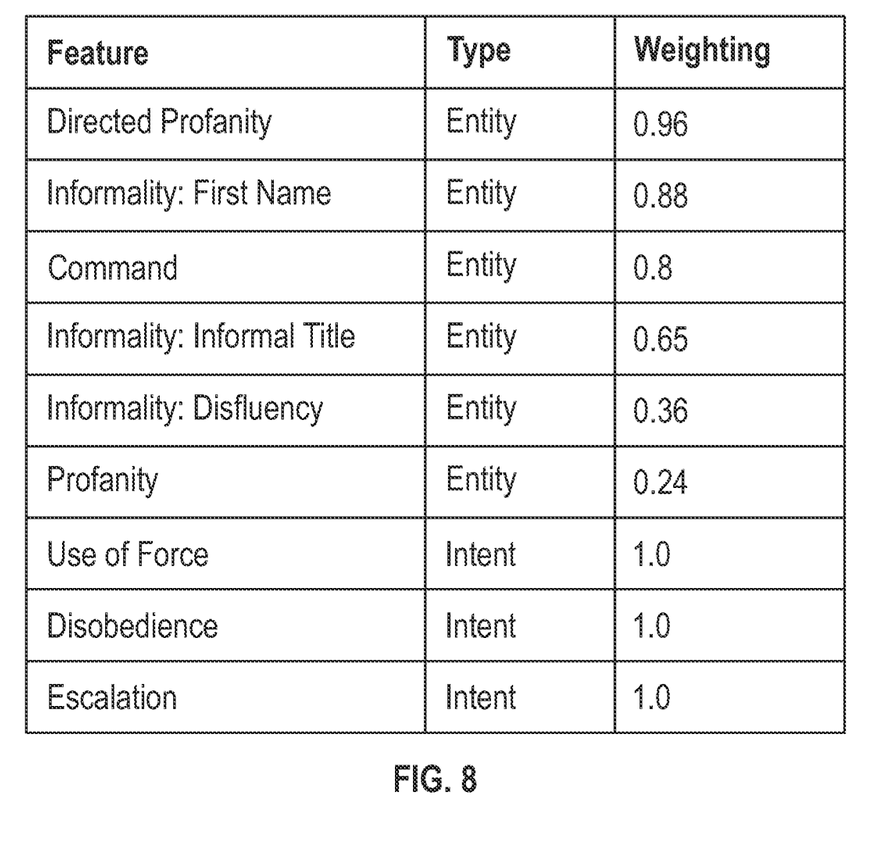
FIG. 8 shows exemplary weights of positive coefficients.
Figure 9:
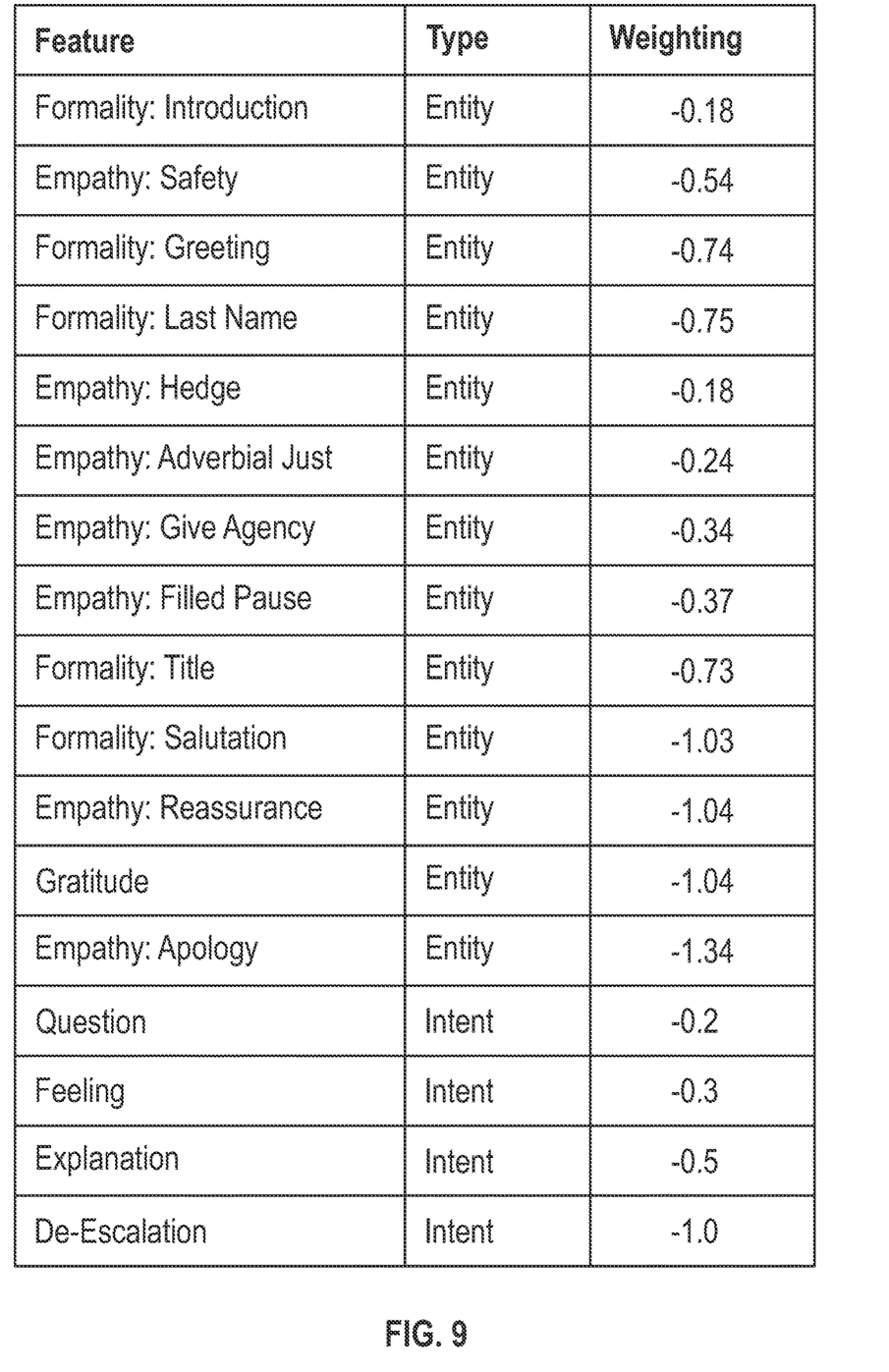
FIG. 9 shows exemplary weights of negative coefficients.

The system and methods detailed herewithin can utilize the features from FIG. 7 and assign them department-tunable weights of importance. Transcripts can be scored based on each of these weights, and the highest risk videos can then be surfaced by ranking based off of a single risk score. In at least one instance, the risk score can be used to rank videos, officers, precincts, and departments, which, for example, can surface outliers and trends. Additionally, in at least one instance, the features of the risk score not only score the interaction, but side effects on participants. An analogous officer wellness model can include the same features to score which officers may be at most risk of wellness issues based on the same risk score. All analysis detailed herein, including analysis of risk score, can be done in real-time or even on the body camera device itself. An example set of weights of positive coefficients (more risk) are shown in FIG. 8. Additionally, an example set of weights of negative coefficients (more respect) are shown in FIG. 9.

In at least one aspect, the present disclosure includes an audio analysis method to identify behavior, emotion, and sentiment within a body worn camera video. The audio detailed herein can be analyzed in real-time or in historical fashion. The methods detailed herewithin can perform voice activity detection on an audio stream to reduce the amount of audio that needs to be analyzed. Methods shown and/or described herein can identify emotion, behavior, and sentiment using machine-learned classifiers within the transcribed audio. Further, methods shown and/or described herein can measure disfluencies and other voice patterns that are used to further the analysis. Methods shown and/or described herein can include determining which videos should be retained long-term based on an abundance of features of interest. Further still, systems and methods detailed herein can use natural language processing, including via a machine learned model, to analyze body cam audio for behavior and/or emotional sentiment. Even further, linguistic features can be identified in the present systems and methods. In other aspects, systems and methods detailed herein can weight positive and negative coefficients.

In examples involving police officers, natural language processing can be used to score officer performance, respectfulness, wellness, etc. Further, officers can be anonymously detected and identified. Additionally, methods and systems detailed herein can selectively process officer or civilian audio.

The present disclosure can be understood more readily by reference to the instant detailed description, examples, and claims. It is to be understood that this disclosure is not limited to the specific systems, devices, and/or methods disclosed unless otherwise specified, as such can, of course, vary. It is also to be understood that the terminology used herein is for the purpose of describing particular aspects only and is not intended to be limiting.

The instant description is provided as an enabling teaching of the disclosure in its best, currently known aspect. Those skilled in the relevant art will recognize that many changes can be made to the aspects described, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the instant description is provided as illustrative of the principles of the present disclosure and not in limitation thereof.

As used herein, the singular forms "a," "an" and "the" include plural referents unless the context clearly dictates otherwise. Thus, for example, reference to a "body" includes aspects having two or more bodies unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although several aspects of the disclosure have been disclosed in the foregoing specification, it is understood by those skilled in the art that many modifications and other aspects of the disclosure will come to mind to which the disclosure pertains, having the benefit of the teaching presented in the foregoing description and associated drawings. It is thus understood that the disclosure is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described disclosure.

What is claimed is:

1. A method of using machine natural language processing to analyze language in transcribed camera footage comprising:
   extracting at least one audio segment from a body camera video track;
   detecting voice activity to identify starting and ending timestamps of voice;
   transcribing the at least one audio segment;
   identifying audio of at least one speaker;
   separating the audio of the at least one speaker;
   scoring the audio of the at least one speaker after separation to identify interactions of interest;
   wherein a voice detection model is used to analyze the at least one audio segment to identify the starting and ending timestamps of voice; and,
   wherein each word in the at least one audio segment is assigned a start and stop time.

2. The method of claim 1 wherein the at least one speaker is a figure of authority, including one of a: police officer, emergency technician, guard, soldier, doctor, or first responder.

3. The method of claim 2 wherein the interactions of interest include whether the figure of authority is escalating or de-escalating a situation.

4. The method of claim 2 wherein the interactions of interest include whether the figure of authority is using respectful language or negative language.

5. The method of claim 2 wherein the scoring includes analyzing for word disfluencies or filler words to analyze speaker confidence.

6. The method of claim 2 wherein the figure of authority is identified based on voice quality.

7. The method of claim 6 wherein the transcribing identifies whether audio of at least an other speaker is included on the at least one audio segment.

8. The method of claim 1 wherein the method further includes:
identifying events that may have occurred in the body camera video track based on language cues in the at least one audio segment.

9. The method of claim 8 wherein the method further includes:
compressing the body camera video track based on the events.

10. The method of claim 1 wherein the method is performed in real-time.

11. The method of claim 1 wherein an intent classification model utilizes a deep-learned transformer architecture.

12. The method of claim 11 wherein a sentiment analysis is performed to output labels with probabilities, with the labels comprising either a "positive" label or a "negative" label.

13. The method of claim 12 wherein the sentiment analysis further comprises analyzing the at least one audio segment for word disfluencies.

14. The method of claim 13 wherein the sentiment analysis further comprises giving weights that correlate with positive or negative sentiment.

15. The method of claim 11 wherein a sentiment analysis is performed to output labels with probabilities, with the labels comprising either a "positive" label or a "negative" label.

16. The method of claim 2 wherein the at least one speaker includes a first police officer wearing a body camera from which the body camera video track was extracted and a second police officer; wherein the second police officer is producing a second audio that is included on the at least one audio segment; wherein the method identifies the first police officer as the at least one speaker; and wherein the method separates the audio of the first police officer as the at least one speaker.

17. The method of claim 1 wherein, if a speaker change occurs, the at least one audio segment is re-segmented to include segments of only the at least one speaker.

18. The method of claim 1 wherein the voice detection model is based on audio analysis and does not rely on visual data to determine the start and stop time.

19. The method of claim 18 wherein, if a speaker change occurs, the at least one audio segment is re-segmented to include segments of only the at least one speaker.

* * * * *